US012808706B2

(12) United States Patent
Piva

(10) Patent No.: US 12,808,706 B2
(45) Date of Patent: Nov. 24, 2026

(54) GRAVIMETRIC METERING DEVICE AND CONTROL METHOD THEREOF

(71) Applicant: PEGASO INDUSTRIES S.P.A., Borgoricco (IT)

(72) Inventor: Rinaldo Piva, Borgoricco (IT)

(73) Assignee: Pegaso Industries, S.p.A., Borgoricco (IT)

(*) Notice: Subject to any disclaimer, the term of this patent is extended or adjusted under 35 U.S.C. 154(b) by 350 days.

(21) Appl. No.: 18/556,017

(22) PCT Filed: Apr. 19, 2022

(86) PCT No.: PCT/IB2022/053646

§ 371 (c)(1), (2) Date: Oct. 18, 2023

(87) PCT Pub. No.: WO2022/224136

PCT Pub. Date: Oct. 27, 2022

(65) Prior Publication Data

US 2024/0201002 A1 Jun. 20, 2024

(30) Foreign Application Priority Data

Apr. 19, 2021 (IT) ........................ 102021000009806

(51) Int. Cl.
*G01G 13/24* (2006.01)
*B29B 7/60* (2006.01)
(Continued)

(52) U.S. Cl.
CPC ........... *G01G 13/242* (2013.01); *B29B 7/603* (2013.01); *B29B 7/72* (2013.01); *B29B 7/88* (2013.01)

(58) Field of Classification Search
CPC ...... G01G 13/242; G01G 19/32; B29B 7/603; B29B 7/72; B29B 7/88; G01F 13/005
(Continued)

(56) References Cited

U.S. PATENT DOCUMENTS 4,582,454 A * 4/1986 Brandenburg ......... B65G 53/66 177/128
5,125,535 A * 6/1992 Ohlman ............... G01G 11/083 222/77
(Continued)

FOREIGN PATENT DOCUMENTS

WO WO-0059708 A1 * 10/2000 ........... B29C 48/501

*Primary Examiner* — John E Breene
(74) *Attorney, Agent, or Firm* — Volpe Koenig

(57) ABSTRACT

A gravimetric metering device which is provided to add an additive material to a polymer material, includes:

a hopper to contain the additive material, a supply member to transport the additive material discharged from the hopper towards the polymer material, and first and a second weighing elements to detect the weight of the additive material discharged from the gravimetric metering device.

A control unit determines, on the basis of the weight detected by the first weighing element, the flow rate of additive material discharged from the gravimetric metering device by regulating the supply member and controls the operation of the first weighing element by means of the second weighing element by comparing, at the start and at the end of a cycle for charging the hopper with the additive material, the weight detected by the first weighing element with the weight detected by the second weighing element.

7 Claims, 2 Drawing Sheets

(51) Int. Cl.
*B29B 7/72* (2006.01)
*B29B 7/88* (2006.01)

(58) Field of Classification Search
USPC .............................................................. 177/64
See application file for complete search history.

(56) References Cited

U.S. PATENT DOCUMENTS

| | | | | |
|---|---|---|---|---|
| 5,289,724 | A * | 3/1994 | Hafner ................. | G01G 11/083 222/77 |
| 5,353,960 | A * | 10/1994 | Hafner ................... | G01G 13/10 177/16 |
| 7,175,048 | B2 * | 2/2007 | Wolfschaffner ..... | G01G 13/028 222/64 |
| 7,690,268 | B2 * | 4/2010 | Wolfschaffner .......... | F23K 3/02 73/861.351 |
| 8,636,138 | B2 * | 1/2014 | Blickley ................ | G01G 11/00 198/657 |
| 12,061,111 | B2 * | 8/2024 | Staender .............. | H05K 7/1424 |
| 12,152,928 | B2 * | 11/2024 | Feldotte ................... | H05K 5/02 |
| 2024/0201003 | A1 * | 6/2024 | Piva ..................... | G01G 13/242 |
| 2025/0019592 | A1 * | 1/2025 | Pearce .................... | F04B 23/00 |
| 2025/0035479 | A1 * | 1/2025 | Bernegger ........... | G01G 13/003 |

* cited by examiner

GRAVIMETRIC METERING DEVICE AND CONTROL METHOD THEREOF

TECHNICAL FIELD

The present invention relates to a gravimetric metering device having the features set out in the preamble of the main claim and a method for controlling a gravimetric metering device.

In particular, the invention is used in a preferable though non-exclusive manner in the field of working plastics materials.

TECHNOLOGICAL BACKGROUND

In the technical field mentioned above, it is widely known to produce objects made of polymeric material starting from a polymer admixture comprising one or more polymer materials, for example, in the form of granules or flakes or powder, which are suitably mixed with appropriate additive materials capable of conferring on the final product specific chemical/physical or mechanical characteristics which are adequate for the objectives intended for the use thereof.

These additive materials can be both of an organic type and of an inorganic type with very different characteristics form each other, in terms of chemical composition or form or physical state.

Examples of additive materials which are commonly used in the working processes of plastics materials are: stabilizing compounds, antioxidant compounds, colouring compounds, expanding compounds or, furthermore, compounds with barrier properties with respect to the passage of gas.

In a wide range of cases of working processes for plastics materials, the additive materials are added to the polymer admixture just before the moulding step or extrusion step and, to this end, gravimetric metering devices are commonly used and are typically positioned downstream of a feed hopper of a transforming machine, in which the polymer admixture is heated and dried.

In general terms, a gravimetric metering device comprises a hopper which contains the additive material to be added to the polymer admixture and a supply member, for example, a screw type supply member, which provides for introducing into the polymer admixture the additive material which is discharged from the hopper.

Furthermore, there are known gravimetric metering devices comprising a weighing unit which is associated with the hopper in order to detect over time the weight variation and therefore to determine the quantity of additive material discharged from the hopper and added to the polymer admixture.

In particular, the weighing unit may comprise a load cell, on which the hopper is supported (and possibly also the supply member) and is preferably connected to a control unit which, on the basis of the weight data received from the weighing unit, regulates in a suitable manner the functionality of the supply member, for example, by adjusting the rotation speed of the screw.

The Applicant has observed that, in some cases, the quantity of additive material which has to be added to the polymer admixture being processed must be very precise with extremely small margins for error.

In these cases, the precision of the weighing unit takes on a fundamental importance so that even small measurement errors may bring about the waste of large quantities of final product, the stopping of production and the loss of time and for restoring the correct functionality of the metering device which generally involves a recalibration of the weighing unit.

Therefore, the Applicant has found that the metering of additive materials often becomes a particularly critical passage of the working process of the plastics materials and has thus felt the need for providing gravimetric metering devices which allow the possibility of metering errors to be reduced to the greatest possible extent.

In the present description and in the appended claims, the term "polymer material" is intended to be a material in which at least 90% is formed by one or more polymers.

The polymer material may be any material which is suitable and normally used in working of plastics materials. Preferably, it is a thermoplastic material, such as, for example, polyolefins, polyesters, polyamides and the copolymers thereof. A preferred example of polymer material is polyethylene terephthalate (PET).

Preferably, the polymer material is in granular form, this term being intended to be a plurality of solid elements which are different and separate from each other and which have dimensions and shapes which are suitable in accordance with the processing to be carried out and the material used, including the polymer material in powdered or flake form.

The term "additive material" is intended to be a material which is intended to be added to a polymer material before the forming thereof in order to modify one or more chemical/physical characteristics thereof.

In particular, the additive material is added to a polymer material at weight fractions less than 20%, more preferably less than 10%, with respect to the polymer admixture formed by the polymer material and the additive material.

DISCLOSURE OF THE INVENTION

The problem addressed by the present invention is to provide a gravimetric metering device and a control method for a gravimetric metering device which are structurally and functionally configured to at least partially overcome one or more of the disadvantages set out above with reference to the cited prior art.

This problem is solved by the present invention by means of a gravimetric metering device and a control method for it which are realised according to the appended claims.

In a first aspect thereof, therefore, the present invention is directed to a gravimetric metering device which is provided to add an additive material to a polymer material.

Preferably, the gravimetric metering device comprises:

- a hopper which can contain the additive material,
- a supply member which is provided to receive the additive material which is discharged from the hopper and to transport it towards a discharge opening which is connected to the polymer material,
- a first weighing element which is provided to detect the weight of the additive material which is discharged from the gravimetric metering device,
- a control unit which is provided to bring about, on the basis of the weight detected by the first weighing element, the flow rate of additive material which is discharged from the gravimetric metering device.

Preferably, the first weighing element is associated at least with the hopper.

Preferably, the gravimetric metering device comprises a second weighing element which is associated at least with the hopper analogously to the first weighing element.

Preferably, the second weighing element is provided to detect the weight of the additive material discharged from the gravimetric metering device.

Preferably, the control unit is provided to regulate the supply member in accordance with the quantity of additive material which is discharged from the gravimetric metering device.

Preferably, the control unit is provided to determine the flow rate of additive material which is discharged from the gravimetric metering device only on the basis of the weight detected by the first weighing element.

Preferably, the control unit is provided to control the correct operation of the first weighing element by means of the second weighing element.

Preferably, the control unit is provided to control the correct operation of the first weighing element by means of the second weighing element at the start and at the end of a cycle for charging the hopper with the additive material.

In a second aspect thereof, the present invention is directed towards a method for controlling a gravimetric metering device which is provided to add an additive material to a polymer material.

Preferably, the gravimetric metering device is constructed according to the above-mentioned first aspect.

Preferably, the method comprises the steps of:

detecting, by means of the first weighing element, the weight of at least the hopper which contains the additive material, and determining, by means of the control unit, the flow rate of additive material which is discharged from the gravimetric metering device within a predefined time period from the weight measurements detected only by the first weighing element.

Preferably, the method comprises the step of regulating the supply member in accordance with the flow rate of additive material which is discharged from the metering device within the predefined time period.

Preferably, the method comprises the step of detecting the weight of at least the hopper both by means of the first weighing element and, at the same time, by means of the second weighing element at the start and at the end of a cycle for charging the hopper with the additive material.

Preferably, the method comprises the step of comparing the weight values detected by the first and second weighing elements and, if these weight values differ from each other by a quantity or a fraction greater than a predefined threshold, the method comprises the step of emitting an alarm signal.

As a result of the features set out above, the gravimetric metering device of the present invention is provided with a first weighing element which is used to detect the weight of the material which is discharged and to allow the regulation of the operation of the supply member, and a second weighing element which is used only to control the correct operation of the first weighing element.

In other words, the regulation of the supply member is carried out only using the weight measurements detected by the first weighing element while the second weighing element is used only to control the correctness of the measurements supplied by the first weighing element.

In this manner, the first weighing element operates substantially continuously while the second weighing element operates in a discrete manner so as to control the first measurement element only from time to time, intermittently, and particularly at the start and the end of the step of charging the additive material in the hopper.

In fact, the Applicant has verified that the provision of two weighing elements which are positioned in a parallel manner and which are both intended to measure the weight of the hopper and the material contained therein may involve some disadvantages for the correct control of the supply member.

In fact, even if the two weighing elements are correctly calibrated, function correctly and are positioned correctly, the weight measurements carried out by them may be different from each other as a result of possible imbalances of the hopper, in particular of the additive material therein. The deviation between the weight measurements detected may involve an unjustified intervention of the control unit which generates an alarm and a resultant production stoppage.

As a result of the present invention, on the contrary, the control of the supply member is based only on the first weighing element and the control is carried out by detecting the weights of the hopper and the content thereof at the start and at the end of the charging of the additive material. This characteristic advantageously allows an ability to evaluate the correct operation of the first weighing element by comparing not so much the absolute instant measurements of the two weighing elements, but rather a difference between the measurements, thereby eliminating the effects of any imbalances and also any small misalignments between the two weighing elements. On the other hand, the measurement which is effectively relevant for the purposes of the correct regulation of the supply member is the measurement of the loss of weight and not so much the absolute measurement of the weight.

In this manner, the correct detection of the weight carried out by the first weighing element is controlled at a predetermined frequency, allowing a rapid and timely identification of any misalignments, even small ones, of the first weighing element, preventing or in any case reducing to a minimum the incorrect metering operations and the resultant losses of production, including those also due to false alarms.

In at least one of the aspects set out above, the present invention may further have one or more of the additional preferred features set out below.

In a preferred embodiment, the supply member comprises a screw which extends between an outlet of the hopper and the discharge opening and a motor provided to rotate the screw.

Preferably, the control unit determines the functionality of the supply member by regulating the rotation speed of the screw.

In a preferred embodiment, the first weighing element and preferably also the second weighing element detect(s) the weight both of the supply member and of the hopper.

There is thereby obtained a greater precision in detecting the quantity of additive material which is effectively discharged in the unit of time from the gravimetric metering device because the additive material present in the supply member, in addition to the material present in the hopper, is also properly weighed.

Preferably, the hopper and the supply member are mounted on a plate which is in turn removably connected to a weighing unit comprising the first and the second weighing elements.

This feature affords rapid access to the weighing elements in the case of maintenance or replacement.

Preferably, the first and the second weighing elements are positioned one adjacent to the other and are charged by the weight of the same components of the gravimetric metering device.

In this manner, the comparison between the weight detected by the two weighing elements is more simple and reliable.

Preferably, the first and second weighing elements are identical to each other.

In an alternative embodiment, the first weighing element is configured to detect a weighing range which is different from the second weighing element.

Preferably, the weighing ranges of the first and the second weighing elements overlap each other over at least 50% of the respective ranges.

Preferably, the first and the second weighing elements are formed by load cells.

In one embodiment, there is calculated the weight of the additive material charged in the hopper on the basis of the weight measurements of the first weighing element, in particular by calculating the difference between the weights detected at the end and at the start of the charging operation. At the same time, the weight of the additive material charged in the hopper is also calculated on the basis of the weight measurements detected by the second weighing element, always by calculating the difference between the weights detected at the end and at the start of the charging operation.

The two weight values of the additive material charged in the hopper calculated in this manner are thereby compared with each other in order to identify any deviations.

In this manner, the congruence of the values detected by the weighing elements is controlled at the minimum and maximum weights which need to be measured.

In one embodiment, the alarm signal is emitted when the weight values detected by the first and by the second weighing elements differ from each other by at least 5%.

The alarm signal may be of any suitable type for informing an operator of the potential malfunction of the gravimetric metering device and, for example, may comprise the emission of an alarm message on a control monitor and/or the emission of an acoustic signal or, in addition, direct action on the processing process of the polymer material.

BRIEF DESCRIPTION OF THE DRAWINGS

The features and advantages of the invention will be better understood from the detailed description of a preferred embodiment thereof, which is illustrated by way of non-limiting example with reference to the appended drawings, in which.

PREFERRED EMBODIMENT OF THE INVENTION

With reference to the appended Figures, there is generally designated 1 a gravimetric metering device which is realised according to the present invention.

The gravimetric metering device 1 is provided to add an additive material to a polymer material being supplied to a transforming machine, such as, for example, a pressing mould or an extruder, in which the polymer material is melted and moulded in order to form a desired article.

Figure 1:
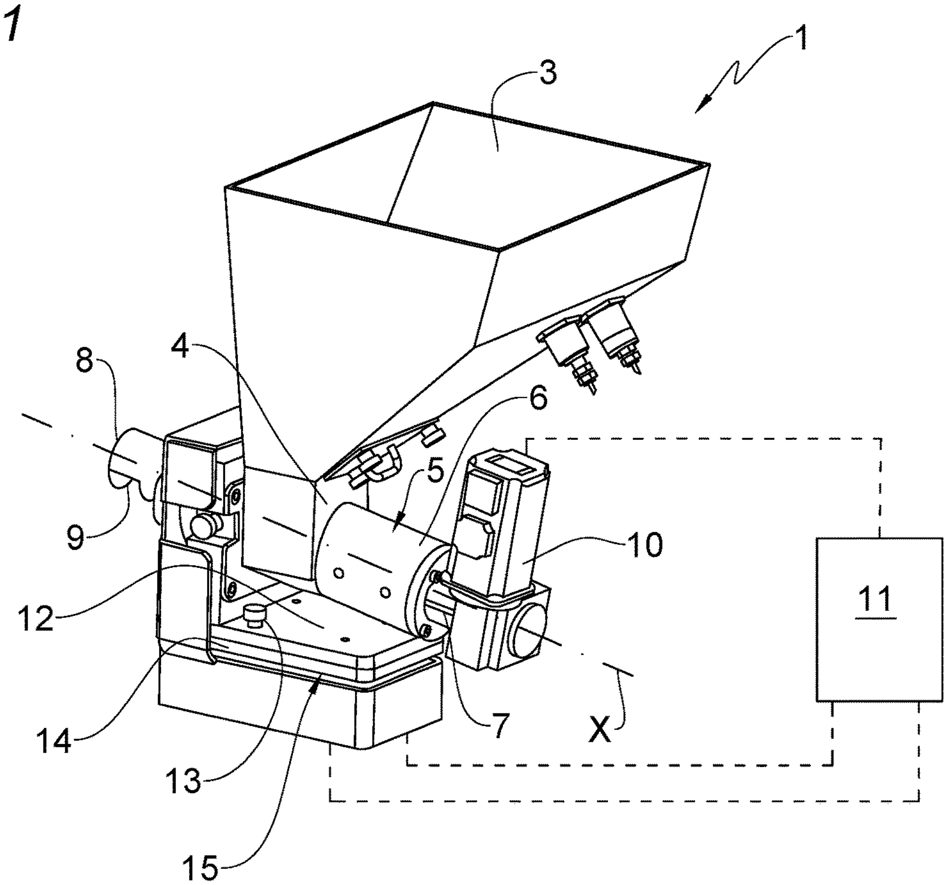
FIG. 1 is a schematic perspective view of a gravimetric metering device realised according to the present invention.
Figure 2:
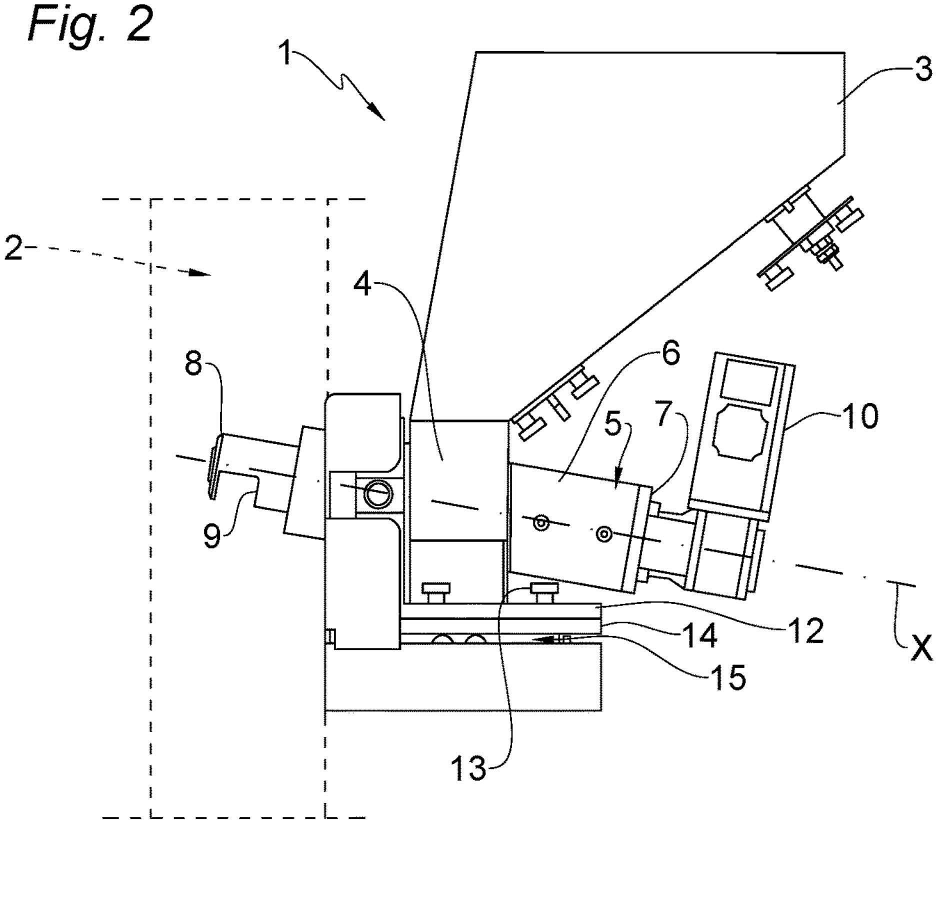
FIG. 2 is a schematic side view of the gravimetric metering device of FIG. 1.
Figure 3:
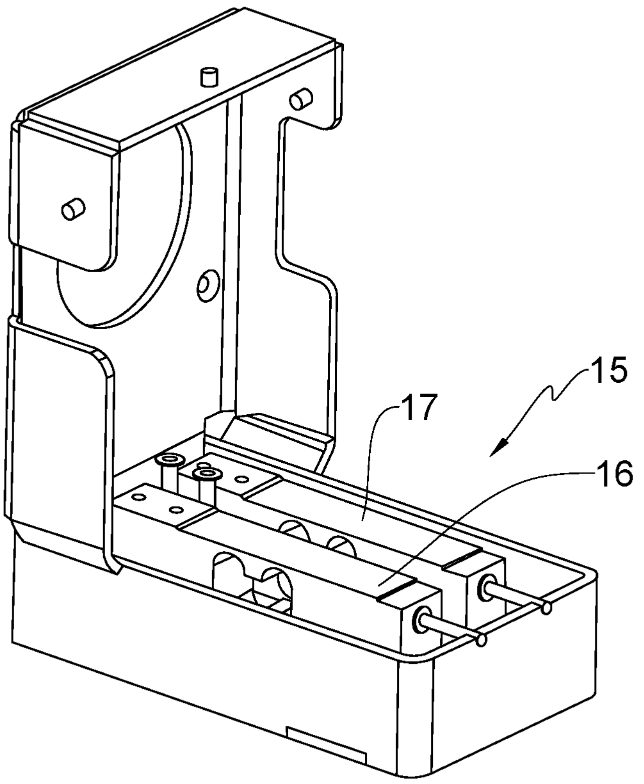
FIG. 3 is a schematic perspective view of a component of the gravimetric metering device of FIG. 1.

Preferably, the polymer material is in granular form and comes from a drying hopper (which is conventional per se and is not illustrated in the appended Figures), where it is heated and dried before being supplied to the transforming machine. In particular, the gravimetric metering device 1 introduces the additive material inside a pipe 2 which is depicted with broken lines in FIG. 2 and which connects the drying hopper to the transforming machine.

The polymer material is preferably PET and the additive material, which is also in granular form, is, for example, a stabilizing compound or a colouring compound.

The gravimetric metering device 1 comprises a hopper 3 which is connected by means of an outlet 4, which is formed on the base of the hopper 3, to a supply member 5. The supply member 5 comprises a screw which is received inside a cylinder 6 which extends in a longitudinal direction X between a first end 7 and a second end 8 where a discharge opening 9, from which the additive material is introduced into the pipe 2, is defined.

The screw of the supply member 5 is rotated by a motor 10 which is mounted at the first end 7 on the cylinder 6. In turn, the motor 10 is controlled by a control unit 11 so as to regulate the rotation speed of the screw and, consequently, the quantity of additive material per unit of time (in other words, the flow rate) which is present in the supply member 5 and transported towards the discharge opening 9.

The hopper 3 and the entire supply member 5 (cylinder, screw and motor) are mounted on a plate 12 which is L-shaped and which is in turn supported on a weighing unit 15.

Preferably, the plate 12 is removably fixed, for example, with screws 13, to a corresponding plate 14 of the weighing unit 15.

The weighing unit 15 further comprises a first weighing element 16 and a second weighing element 17 which are formed, for example, by two respective load cells which are mutually identical and which are positioned one beside the other and which are configured to detect the weight of the plate 14 and of everything supported thereon.

The first and the second weighing elements 16, 17 are further independently connected to the control unit 11 which receives and processes the weight signals detected thereby with the main objective of establishing the quantity of additive material per unit of time discharged from the gravimetric metering device 1 and consequently to regulate the supply member 5 so as to comply with a predefined target flow rate value.

The gravimetric metering device 1 operates as follows.

The additive material to be metered inside the polymer material is charged in the hopper 3 in accordance with a predetermined percentage which is imposed (manually or automatically) in the control unit 11.

As a function of the flow rate of polymer material, the control unit 11 establishes the flow rate of additive material to be introduced into the pipe 2 during the passage of the polymer material and, consequently, regulates the rotation speed of the screw which transports the additive material.

When the additive material inside the hopper 3 ends, or reaches a minimum level, the hopper 3 is charged with new additive material to be introduced into the pipe 2.

The weight of the hopper 3, the supply member 5 and the plates 12 and 14 is detected in a substantially continuous manner by both the weighing elements 16, 17, but the regulation of the supply member 5 carried out by the control unit 11 is based only on the weight value detected by the first weighing element 16, while the weight value detected by the second weighing element 17 is used by the control unit 11 only to control the correct operation of the first weighing element 16.

In particular, the control unit 11 determines the flow rate of additive material which is discharged from the gravimetric metering device 1 simply by calculating the weight decrease detected over time by the first weighing element 16. In fact, a weight variation detected by the weighing element may be attributed only to the variation of additive material present in the gravimetric metering device 1.

The flow rate value of additive material which is calculated is compared with the target value and, if necessary, the rotation speed of the screw is possibly adjusted.

At some times of the process, the control unit 11 provides for a comparison of the weight value detected by the first and second weighing elements 16, 17 in order to verify the congruence thereof.

If the values detected by the two weighing elements are congruent or at least differ by an acceptable and predefined tolerance range, then the metering process of the additive material continues in the preceding manners while instead, if the values detected by the two weighing elements differ by a value or a fraction greater than the tolerance range, then the control unit 11 emits an alarm signal, such as, for example, an indication on the monitor where applicable accompanied by an acoustic signal.

By way of example, the tolerance range may be defined as 5% of the weight value detected by the first or second weighing element.

Following the alarm signal, the operator or the control unit 11 itself may continue to interrupt the process for supplying the polymer material and metering the additive material and to start the maintenance of the weighing elements which can, for example, provide for a recalibration or replacement thereof.

Still by way of example, the control unit 11 can be programmed to carry out the comparison between the weight values detected by the two weighing elements 16, 17 on the occasion of the periodic charging cycles of the hopper 3, for example, by measuring the weight values before and after it is charged.

In particular, the weight measured by the first and second weighing elements 16, 17 is detected at the start of charging and at the end of charging so that the weight of additive material charged in the hopper is calculated, as a result of the difference, from the weight values measured both by the first and by the second weighing elements 16, 17.

The weights calculated in this manner are therefore compared with each other and, if they deviate by a quantity greater than a specific threshold, for example, equal to 5%, then an alarm signal is generated.

The person skilled in the art will know how to apply suitable variants to the present invention in accordance with any specific requirements, all being included within the scope of protection defined by the appended claims.

For example, the metering device may have any number of hoppers.

The invention claimed is:

1. A gravimetric metering device (1), which is provided to add an additive material to a polymer material, the gravimetric metering device (1) comprising:

a hopper (3) configured to contain the additive material, a supply member (5) which is provided downstream of the hopper (3) in order to receive the additive material which is discharged from the hopper (3) and to transport the additive material towards a discharge opening (9) which leads to the polymer material, a first weighing element (16) which is associated at least with the hopper (3) and which is provided to detect the weight of the additive material discharged from the gravimetric metering device (1), a second weighing element (17) which is associated at least with the hopper (3) analogously to the first weighing element (16) and which is provided to detect the weight of the additive material which is discharged from the gravimetric metering device (1), and a control unit (11) which is provided to determine, on the basis of the weight detected only by the first weighing element (16), a flow rate of the additive material which is discharged from the gravimetric metering device (1) and to regulate the supply member (5) in accordance with the flow rate, wherein the control unit (11) is configured to control the correct operation of the first weighing element (16) by comparing, at a start and at an end of a cycle for charging the hopper (3) with the additive material, the weight detected by the first weighing element (16) with the weight detected by the second weighing element (17).

2. The gravimetric metering device according to claim 1, wherein the supply member (5) comprises a screw which extends between an outlet (4) of the hopper (3) and the discharge opening (9) and a motor (10) for driving the screw.

3. The gravimetric metering device according to claim 1, wherein the first weighing element (16) detects the weight of the supply member (5) and of the hopper (3).

4. The gravimetric metering device according to claim 1, wherein the first and second weighing elements (16, 17) are positioned one adjacent to the other and are charged by the weight of the same components of the gravimetric metering device (1).

5. The gravimetric metering device according to claim 1, wherein the first and second weighing elements (16, 17) are identical to each other.

6. A method for controlling a gravimetric metering device (1) which is provided to add an additive material to a polymer material, the gravimetric metering device comprising:

a hopper (3) configured to contain the additive material, a supply member (5) which is provided downstream of the hopper (3) in order to receive the additive material which is discharged from the hopper and to transport it towards a discharge opening (9) which leads to the polymer material, a first weighing element (16) and a second weighing element (17) which are associated at least with the hopper (3), and a control unit (11) which is associated with the supply member (5) and the first and second weighing elements (16, 17), wherein the method comprises:

detecting, by the first weighing element (16), the weight of at least the hopper (3), determining, by the control unit (11), the flow rate of additive material which is discharged from the gravimetric metering device (1) within a predefined time period from the weight measurements detected only by the first weighing element (16), regulating the supply member (5) in accordance with the flow rate of additive material which is discharged from the gravimetric metering device (1) within the predefined time period, detecting at the same time the weight of at least the hopper (3) by the first weighing element (16) and by the second weighing element (17) at the start and at the end of a cycle for charging the hopper (3) with the additive material, comparing the weight values detected by the first and second weighing elements (16, 17), and, if the weight values differ from each other by a quantity or a fraction greater than a predefined threshold, emitting an alarm signal.

7. The method according to claim 6, wherein the comparing comprises:

calculating the weight of the additive material which is charged in the hopper (3) on the basis of the weight measurements of the first weighing element (16), calculating the weight of the additive material which is charged in the hopper (3) on the basis of the weight measurements of the second weighing element (17), and comparing the weights of the additive material charged in the hopper (3) as calculated from the weight measurements detected by the first and second weighing elements (16, 17).

* * * * *